United States Patent
Miwa et al.

(10) Patent No.: US 7,523,008 B1
(45) Date of Patent: Apr. 21, 2009

(54) THERMAL CALIBRATION IN CELL PROCESSOR

(75) Inventors: Yohichi Miwa, Yokohama (JP); Aya Minami, Fujisawa (JP); Toshiyuki Sanuki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,242

(22) Filed: Mar. 10, 2008

(51) Int. Cl.
*G01K 17/00* (2006.01)
*G06F 19/00* (2006.01)

(52) U.S. Cl. ............... 702/99; 702/130; 713/324
(58) Field of Classification Search ........... 702/85, 702/99, 117–119, 130–134, 136; 374/1, 374/5, 101–104; 713/320, 324; 324/105–106
See application file for complete search history.

(56) References Cited

U.S. PATENT DOCUMENTS

| | | | |
|---|---|---|---|
| 4,768,216 A | | 8/1988 | Harvey et al. |
| 5,659,454 A | * | 8/1997 | Vermesse ............... 361/104 |
| 5,978,163 A | * | 11/1999 | Cunningham ............... 360/66 |
| 6,336,592 B1 | * | 1/2002 | Russell et al. ............... 236/49.3 |
| 6,889,334 B1 | | 5/2005 | Magro et al. |
| 7,184,924 B1 | | 2/2007 | Shabino et al. |
| 7,310,737 B2 | * | 12/2007 | Patel et al. ............... 713/300 |
| 7,376,532 B2 | * | 5/2008 | Johns et al. ............... 702/130 |
| 2007/0055469 A1 | | 3/2007 | Rotem et al. |

FOREIGN PATENT DOCUMENTS

| | | |
|---|---|---|
| WO | WO2006010988 A1 | 2/2006 |
| WO | WO2006115637 A1 | 11/2006 |

* cited by examiner

*Primary Examiner*—Drew A Dunn
*Assistant Examiner*—Mary C Baran
(74) *Attorney, Agent, or Firm*—MaxValueIP, LLC

(57) ABSTRACT

This is an embodiment for enabling calibration of the bus interfacing cell processors and I/O Controllers in a multi-cell system without rebooting the system in response to a change in the environment temperature. This is accomplished by periodically checking the intake temperature. If the temperature rise is less than a predefined threshold, no action is taken. If the temperature rise is more than a predefined threshold, external interfaces are disabled, cell operations are halted and calibration is performed. Once the calibration is completed, cell operations are resumed and external interfaces are re-enabled.

1 Claim, 4 Drawing Sheets

THERMAL CALIBRATION IN CELL PROCESSOR

BACKGROUND OF THE INVENTION

The Cell processor eXtreme Data Range (XDR) memory interface developed by SONY-Toshiba-IBM (STI) has two 32 bit-serial buses, each of which performs high-speed signal transmission by 3.2 Gbps. The interface used to connect between the Cells and between the Cell and the I/O Controller (FlexIO) (input/output) is connected by a bundle of 5 Gbps buses, which is much faster than the 32 bit-serial buses. Therefore, a Cell mounted system is adapted to perform calibration (Initialization) between the Cell and XDR and between the Cell and the I/O Controller in booting.

FIG. 1 depicts a typical block diagram of this cell system with two Cells (120). The FlexIO interface (160) connects between the Cells and between the Cell and the I/O Controller (130). The cell system has a system controller (110) which is connected with the I/O Controller/Cell via the SPI interface (140) and several external interfaces (150). When this cell system boots, it adjusts the clock to timely read data by calibrating the XDR and the FlexIO interface. With that calibration, the system slightly changes the clock position against the data eye to adjust the timing to read the bit-serially transmitted data. The Cell system performs the adjustment on both of the XDR interface and the FlexIO interface in boot up.

Because the clock position for the data depends on the environmental temperature, the XDR interface in the Cell has a correcting mechanism that sends out a simple version of the calibration at certain intervals during the operation. The "FlexIO" interface is less influenced by the temperature than the XDR interface is. Thus, the "FlexIO" interface does not have such a simple correcting mechanism that works during the operation. Some electronic equipment such PlayStation 3 (SONY) or Cell Blade (QS20) developed by IBM are normally used in a rather stable environmental temperature and does not require to correct the FlexIO after the system boot up. When the Cell is used for embedded purposes, especially when environmental temperature significantly changes during the operation, the FlexIO needs correction. The current Cell system has no means for correcting the FlexIO during the operation besides the boot up.

This embodiment addresses the problem of calibrating the interface clock in a multi-cell system between the cell processors and I/O controllers without rebooting and this multi-cell processor is used as an example to better describe this calibration method.

SUMMARY OF THE INVENTION

There is an embodiment for enabling calibration on the FlexIO bus in a cell system without rebooting the system in response to a change in the environmental temperature. This embodiment enables calibration on the FlexIO while keeping the content of the system memory and values of registers, by halting the Cell operation when calibration is needed.

This embodiment periodically measures the temperature by reading the intake temperature. If the temperature change is less than a predefined threshold, no action is taken. If the temperature change is greater or equal the predefined threshold, system controller halts the cell operations, disables the external interfaces, calibrates the FlexIO signal and then resumes the cell operations and enables the external interfaces.

One exemplary advantage of this embodiment is that calibration is faster as system is not rebooted and contents of registers and memory is preserved.

DETAILED DESCRIPTION OF THE PREFERRED EMBODIMENTS

Figure 1:
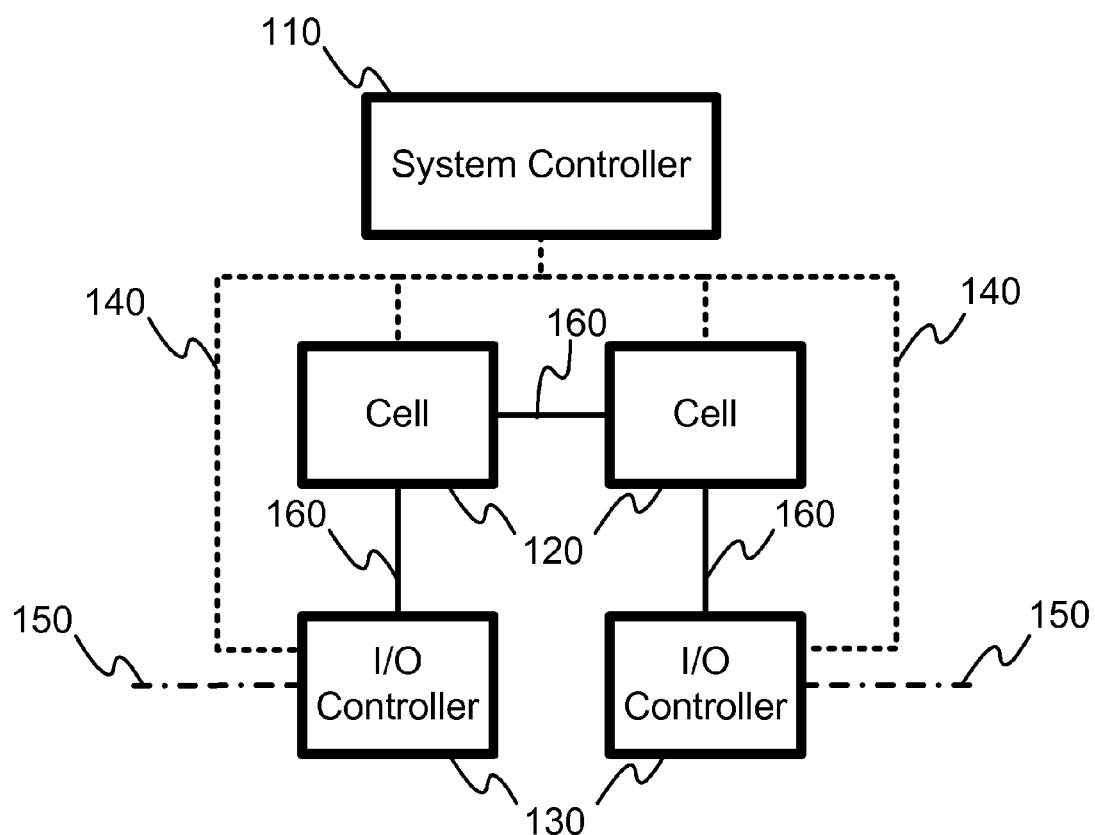
FIG. 1 is the block diagram of the example cell processor referenced in this writing.

This is an embodiment for enabling calibration of the bus interfacing the cell processors and I/O Controllers in a multi-cell system without rebooting the system in response to a change in the environment temperature. The cell system described above and depicted in FIG. 1 is used as an example of a multi-cell system with internal bus which does not have a mechanism for calibration unless it is rebooted.

This embodiment periodically reads the intake temperature or the temperature on the board of the cell system from a temperature measuring diode mounted on the cell system to detect whether the temperature has changed by more than a threshold value after the first calibration at the time of the boot up. This threshold is dependent on many factors such as the number of bus lines, the length of wires or the die materials.

If the temperature has not changed by more than the threshold value, no action is taken. If the temperature has changed by threshold or more than the threshold value, the following steps are performed. First, the system controller halts access to the external interfaces. Halt operation may be performed by means of software or hardware. The system controller then halts the cell operation. This halt may also be performed by means of software such as a Halt command or by means of hardware such as CHECK STOP. Next, the system controller performs calibration on the FlexIO signals for the cell and the IO Controller from the SPI interface for this example device. The system controller then resumes the cell operations and finally system controller resumes accessing the external interfaces.

Another embodiment is a method for thermal calibrating a multi-cell processor's clock, wherein the multi-cell processor comprising a plurality of cell processors, a plurality of input-output controllers, and a system controller, this method comprising: booting the multi-cell processor; reading a first intake temperature; defining a temperature sampling interval; after the temperature sampling interval is passed, reading a second intake temperature.

If a difference between the second intake temperature and the first intake temperature is less than a calibration temperature change, waiting for a period of the temperature sampling interval; wherein the calibration temperature change is a predefined maximum temperature rise; and if the difference between the second intake temperature and the first intake temperature is greater or equal to the calibration temperature change, the system controller halts access to an external interface, the system controller halts a cell operation, the system controller performs calibration on flex input-output signals on a first cell processor of the plurality of cell processors and the first input-output controller of the plurality of input-output controllers, the system controller resumes the cell operation, the system controller resumes access to the external interface, and waiting for a period of the temperature sampling interval.

Figure 2:
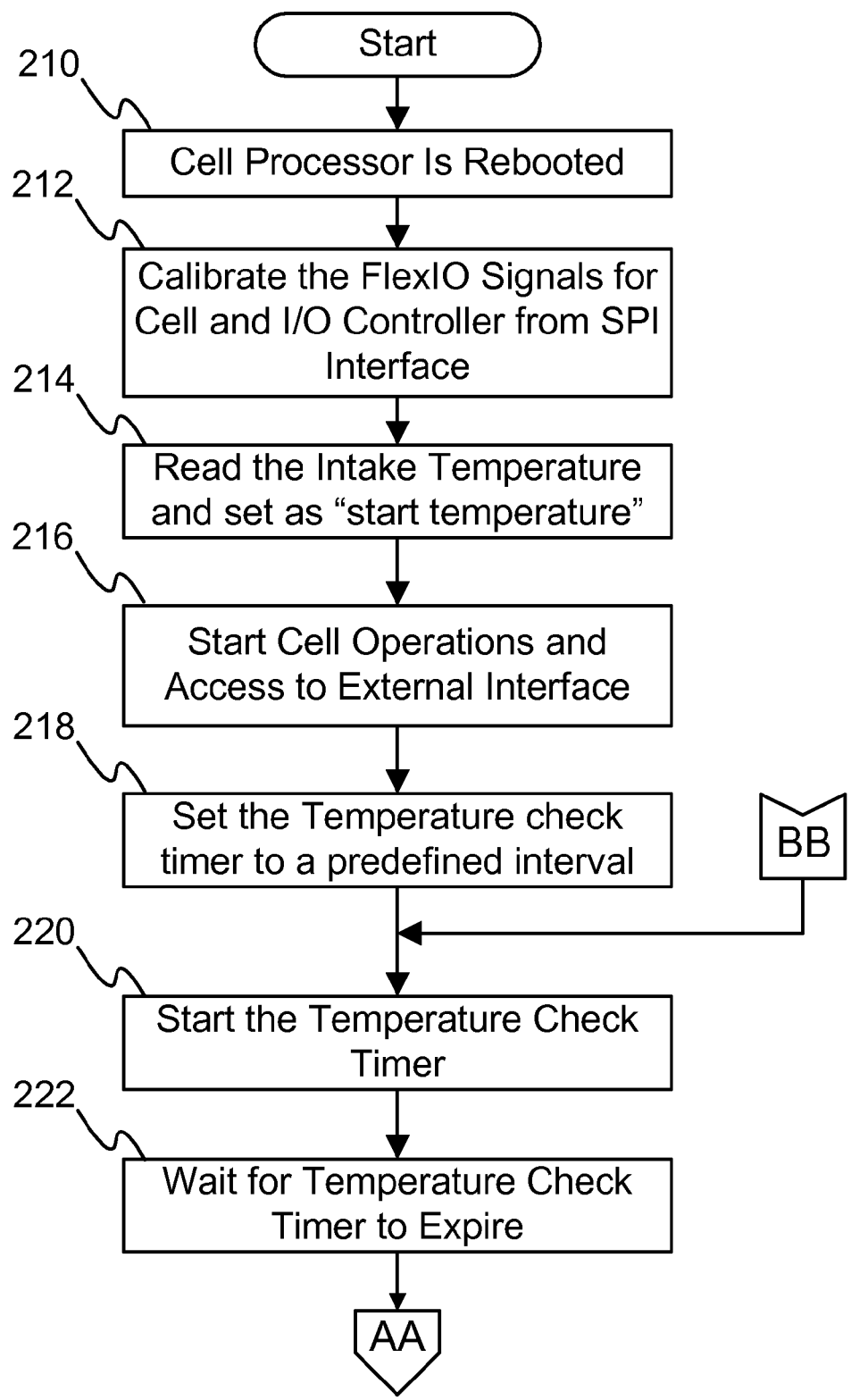
FIG. 2 is the flow diagram of this calibration activation method.
Figure 3:
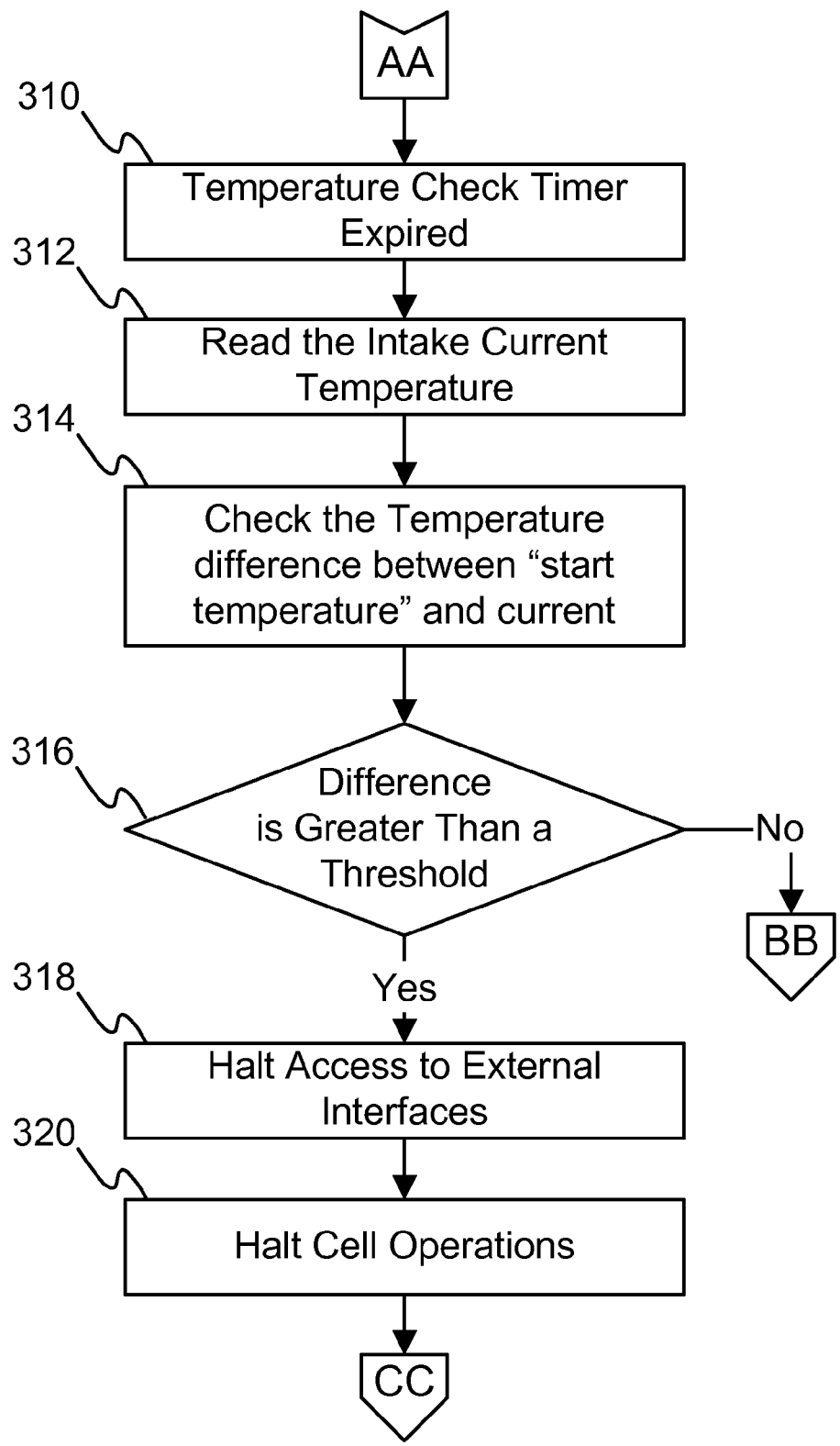
FIG. 3 is the continuation of the flow diagram of this calibration activation method.
Figure 4:
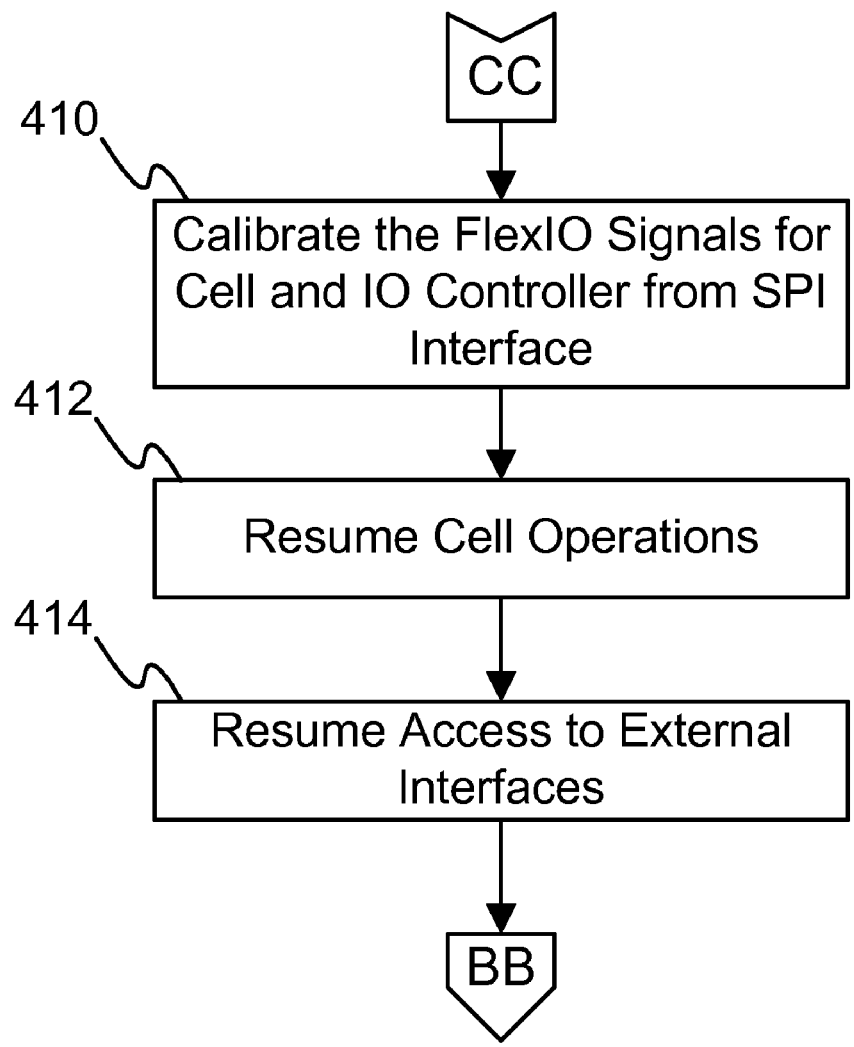
FIG. 4 is the continuation of the flow diagram of this calibration activation method.

Another embodiment of this method is depicted in FIGS. 2, 3 and 4. As the cell processor is rebooted (210), the FlexIO signals for cell and I/O controller is calibrated (212). Then the intake temperature is read (214). This temperature is the start temperature which is used to calculate the temperature difference in the next consecutive reads of this method. At this point cell operations and external interface are enabled (216) and temperature check timer is set to a predefined value (218) and this timer is started (220). The value of this timer indicates how often the temperature must be checked and is configurable. At this stage normal processing of the cell is started and system controller waits for the expiry of this timer (222) to read the temperature again.

Referring to FIG. 3, temperature check timer expires (310), intake temperature is read again (312) and the difference between start temperature and this new value is calculated (314). If this difference is not greater than a predefined threshold (316), no calibration is needed, so temperature check timer is restarted (220) and wait for the next temperature check cycle begins (222).

If difference is greater or equal to the predefined threshold, calibration must be started (316). System controller halts access to external interfaces (318), then halts the cell operations (320) and calibrates the FlexIO interface between the cell and I/O controller (FIG. 4, 410). Once the calibration is done, system controller resumes cell operations (412) and finally resumes access to external interfaces (414). At this point temperature check timer is restarted (220) and system controller waits for the expiry of this timer (222) to start the next temperature check cycle.

A system, apparatus, or device comprising one of the following items is an example of the invention: multi-cell processor, processors, clock, temperature measuring and calibration, external interface, I/O, signals, storage to store the messages, router, switches, network, communication media, cables, fiber optics, physical layer, buffer, nodes, packet switches, computer monitor, or any display device, applying the method mentioned above, for purpose of thermal measuring, calibration, and management.

Any variations of the above teaching are also intended to be covered by this patent application.

The invention claimed is:

1. A method for thermal calibrating a multi-cell processor's clock, wherein said multi-cell processor comprising a plurality of cell processors, a plurality of input-output controllers, and a system controller, said method comprising:
   booting said multi-cell processor;
   reading a first intake temperature;
   defining a temperature sampling interval;
   after said temperature sampling interval is passed, reading a second intake temperature;
   if a difference between said second intake temperature and said first intake temperature is less than a calibration temperature change, waiting for a period of said temperature sampling interval;
   wherein said calibration temperature change is a predefined maximum temperature rise; and
   if said difference between said second intake temperature and said first intake temperature is greater or equal to said calibration temperature change, said system controller performing adjustment steps, without rebooting said multi-cell processor, said adjustment steps comprising:
   halting access to an external interface,
   halting a cell operation,
   performing calibration on flex input-output signals on a first cell processor of said plurality of cell processors and said first input-output controller of said plurality of input-output controllers,
   adjusting said multi-cell processor's clock to timely read data, based on said calibration on said flex input-output signals on said first cell processor of said plurality of cell processors and said first input-output controller of said plurality of input-output controllers,
   resuming said cell operation,
   resuming access to said external interface, and
   waiting for a period of said temperature sampling interval.

* * * * *